United States Patent
Yones et al.

(10) Patent No.: US 11,618,490 B2
(45) Date of Patent: Apr. 4, 2023

(54) EMPTY BOTTOM SHELF OF SHOPPING CART MONITOR AND ALERTING SYSTEM USING DISTANCE MEASURING METHODS

(71) Applicants: Dale Lee Yones, Longmont, CO (US); Scott David Dalgleish, Boulder, CO (US); Craig W. Moyer, York, PA (US)

(72) Inventors: Dale Lee Yones, Longmont, CO (US); Scott David Dalgleish, Boulder, CO (US); Craig W. Moyer, York, PA (US)

(73) Assignee: Bob Profit Partners LLC., York, PA (US)

(*) Notice: Subject to any disclaimer, the term of this patent is extended or adjusted under 35 U.S.C. 154(b) by 247 days.

(21) Appl. No.: 16/907,549

(22) Filed: Jun. 22, 2020

(65) Prior Publication Data

US 2021/0061334 A1 Mar. 4, 2021

Related U.S. Application Data

(60) Provisional application No. 62/895,470, filed on Sep. 3, 2019.

(51) Int. Cl.
*B62B 3/14* (2006.01)
*G07G 1/00* (2006.01)
*A47F 9/04* (2006.01)
*B62B 5/00* (2006.01)

(52) U.S. Cl.
CPC ............ *B62B 3/1488* (2013.01); *A47F 9/045* (2013.01); *B62B 5/0096* (2013.01); *G07G 1/0081* (2013.01)

(58) Field of Classification Search
CPC ..... B62B 3/1488; B62B 5/0096; A47F 9/045; G07G 1/0081; G07G 3/00; G06Q 20/208
See application file for complete search history.

(56) References Cited

U.S. PATENT DOCUMENTS

| | | | | |
|---|---|---|---|---|
| 3,457,423 A * | 7/1969 | Gravely | ............... | G07C 11/00 340/600 |
| 4,725,822 A * | 2/1988 | Hooley | ............. | G08B 13/1481 340/568.5 |
| 5,485,006 A * | 1/1996 | Allen | ................... | A47F 9/045 340/568.5 |
| 5,883,968 A * | 3/1999 | Welch | .................. | G07G 3/003 382/168 |
| 6,542,079 B1 * | 4/2003 | Kahl, Sr. | ............ | G08B 13/1481 340/556 |
| 7,100,824 B2 * | 9/2006 | Ostrowski | ............... | A47F 9/045 235/383 |
| 7,242,300 B1 * | 7/2007 | Konstad | ................... | G07F 7/02 340/568.5 |

(Continued)

*Primary Examiner* — Thien M Le
*Assistant Examiner* — Asifa Habib
(74) *Attorney, Agent, or Firm* — Kenneth Altshuler

(57) ABSTRACT

A method apparatus are directed to identify items disposed on the bottom shelf of a shopping cart bottom of basket (BoB). Certain aspects envision a distance measurement sensor and computing system connected to the shopping cart. A first set of distance measurements of the bottom shelf when empty is obtained via the distance measurement sensor. Next, at a checkout stand, a second set of distance measurements of the shelf are taken, which can be used to compare with the first set of distance measurements to identify if there is an object on the BoB. An alert can be provided to a checkout attendant if there is an object on the BoB.

20 Claims, 6 Drawing Sheets

(56) References Cited

U.S. PATENT DOCUMENTS

| | | | | |
|---|---|---|---|---|
| 8,740,085 | B2* | 6/2014 | Furlong | G06K 7/10722 235/470 |
| 10,908,013 | B2* | 2/2021 | McCloskey | G01G 19/4148 |
| 11,265,518 | B2* | 3/2022 | Yones | H04N 7/185 |
| 2003/0184440 | A1* | 10/2003 | Ballantyne | G08B 13/1481 340/568.5 |
| 2005/0189412 | A1* | 9/2005 | Hudnut | A47F 9/046 235/383 |
| 2006/0147087 | A1* | 7/2006 | Goncalves | G06V 10/25 382/173 |
| 2006/0290494 | A1* | 12/2006 | O'Brien | A47F 9/046 340/568.5 |
| 2008/0088444 | A1* | 4/2008 | Rosebush | B62B 3/1488 340/568.5 |
| 2008/0231431 | A1* | 9/2008 | Stawar | B62B 3/1408 340/8.1 |
| 2016/0189277 | A1* | 6/2016 | Davis | H04N 7/181 705/26.8 |
| 2018/0039841 | A1* | 2/2018 | Richards | G06V 20/52 |
| 2018/0197218 | A1* | 7/2018 | Mallesan | G07G 1/0054 |
| 2020/0198680 | A1* | 6/2020 | Hagen | H04B 5/0062 |
| 2021/0287013 | A1* | 9/2021 | Carter | G06F 18/21 |
| 2021/0300453 | A1* | 9/2021 | Hagen | B62B 3/1488 |
| 2022/0005327 | A1* | 1/2022 | Cleper | G07G 1/0072 |

* cited by examiner

FIG. 6A  FIG. 6B

EMPTY BOTTOM SHELF OF SHOPPING CART MONITOR AND ALERTING SYSTEM USING DISTANCE MEASURING METHODS

CROSS-REFERENCE TO RELATED APPLICATIONS

This application claims priority to and the benefit of U.S. provisional Patent Application No. 62/895,470 entitled: Empty Bottom Shelf of Shopping Cart Monitor and Alerting System Using Distance Measuring Methods, filed on Sep. 3, 2019.

FIELD OF THE INVENTION

The present embodiments are directed to detecting the presence of one or more items located on the bottom of a shopping cart.

DESCRIPTION OF RELATED ART

Customers leaving a store with unpaid items on the bottom rack of a shopping cart, also known as the Bottom of the Basket (BoB), is a chronic problem that amounts to substantial lost revenue for stores. In fact, current estimates are roughly $60,000 of lost revenue per grocery store per year due to items not charged because those items leave the store undetected on the BoB. This is because items on the BoB are commonly not placed on the check-out stand for payment by the checkout attendant and customers may not do so simply by accident or intentionally to pull off a carefully planned theft that if caught can credibly fain plausible deniability. To complicate matters, check-out employees may be hesitant to confront customers about items on the BoB even when they see the items in order to simply avoid confrontation. Another aspect of this problem includes self-check-out stands where there is little oversight by a store employee. Although there are systems that try to solve this problem, none have been effective due to being overly technically complex and over burdensome to maintain. Other concepts ultimately fail to work in practice because cameras or other detectors mounted at the check-out stand produce excessive "false detection" readings, which often confuse BoB items with customer legs and feet. Clearly, when enough false detections waste the time of checkout clerks, the readings are simply ignored. Certain other systems fail in practice due to excessive alignment problems between a cart and a check-out stand detector resulting in unreliable readings.

It is to innovations related to this subject matter that the claimed invention is generally directed.

SUMMARY OF THE INVENTION

The present invention is directed to a one-way or two-way wireless communication between a non-optical distance sensor system on a shopping cart and a transceiver and display at a particular "cart read" location.

Certain embodiments of the present invention contemplate a shopping cart comprising: a basket; a shelf connected to the basket, the shelf located under the basket and spaced sufficiently under the basket to support at least one item; at least one distance measurement sensor connected to the shopping cart, the shelf in a field of view of the distance measurement sensor; a power supply connected to and adapted to power the distance measurement sensor; a shopping cart transceiver connected to and adapted to be powered by the power supply; and a microprocessor, powered by the power supply and connected to the shopping cart transceiver, configured to become fully activated when in an interrogation zone created by an interrogation zone transceiver, the microprocessor configured to determine the presence of the item by comparing a second set of distance measurements of the shelf with the item against a first set of distance measurements of the shelf without the item, the first set of distance measurements and the second set of distance measurements obtained by the distance measurement sensor, the first set of distance measurements retained in non-transitory memory accessible to the microprocessor, the shopping cart transceiver configured to transmit the presence of the item supported by the shelf to the interrogation zone transceiver. Certain embodiments contemplate a battery free transceiver, distance sensor and microprocessor that are inductively powered by radio waves when in the interrogation zone.

Yet, other embodiments of the present invention can therefore comprise a method comprising: providing a shopping cart that possesses a basket, a shelf connected to and located under the basket, a microprocessor, a distance measurement sensor, non-transitory memory, and a shopping cart transceiver; collecting a first set of distance measurements of the shelf when empty via the distance measurement sensor; storing the first set of distance measurements to the non-transitory memory; collecting a second set of distance measurements of the shelf via the distance measurement sensor when within an interrogation zone; comparing the second set of distance measurements with the first set of distance measurements retained in the non-transitory memory; determining a status of whether there is at least one item disposed on the shelf from the comparing step, the status is either an empty status indicating no item disposed on the shelf or a full status indicating at least one item disposed on the shelf; and transmitting the status to an alert system.

Yet further embodiments of the present invention contemplate a method comprising: providing a shopping cart that includes a basket, a shelf connected to and located under the basket, a microprocessor, a distance measurement sensor, non-transitory memory, a power supply, and a shopping cart transceiver, the microprocessor controlling the distance measurement sensor, the non-transitory memory, the power supply, and the shopping cart transceiver; with the microprocessor in an active state, collecting a first set of distance measurements of the shelf when empty via the distance measurement sensor, the active state defined by controlling functionality and power to the distance measurement sensor, the non-transitory memory, and the shopping cart transceiver as well as executing all relevant internal microprocessor functionality; storing the first set of distance measurements to the non-transitory memory; transitioning the microprocessor in a sleep state defined by a low-power consuming condition after the storing step; the shopping cart transceiver receiving a wireless signal when in an interrogation zone produced by a checkout station transceiver; waking up the microprocessor from the sleep state to the active state; collecting a second set of distance measurements of the shelf via the distance measurement sensor when within the interrogation zone after the waking up step; comparing the second set of distance measurements with the first set of distance measurements retained in the non-transitory memory via the microprocessor; determining a status of whether there is at least one item disposed on the shelf from the comparing step, the status is either an empty status indicating no item disposed on the shelf or a full status indicating at least one item disposed on the shelf; transmitting the status to a checkout station; and providing notice at the checkout station of the status.

BRIEF DESCRIPTION OF THE DRAWINGS

FIGS. 6A and 6B show the coverage of four commercially available time-of-flight distance sensors projected on the bottom shelf of a shopping cart consistent with embodiments of the present invention;

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of detecting the presence of one or more items in similar situation as in the bottom of a shopping cart. In what follows, similar or identical structures may be identified using identical callouts.

Certain embodiments of the present invention envision detecting one or more elements disposed on the bottom of a shopping cart by way of at least one distance measuring sensor located at, or otherwise integrated with, a shopping cart that wirelessly communicates the detection of the element/s to a "cart-read" location, such as at a checkout stand.

Some embodiments contemplate a distance measuring sensor selected from a group comprising a Time-of-Flight (TOF) sensor system, such as a commercially available STMicroelectronics VL53L0X Time-of-Flight Sensor produced by STMicroelectronics of Geneva, Switzerland or an Ultrasonic distance-measuring sensor, such as a commercially available HC-SR04 from SparkFun Electronics of Boulder, Colo. A TOF system is a range imaging device that resolves distance of a plurality of points of a target (that can be arranged/spaced in a matrix) based on the known speed of light by measuring the time-of-flight of a light signal between the TOF emitter and detector system and the target (or rather multiple points of a target). An ultrasonic distance-measuring sensor measures the time between sending a signal and receiving an echo of the signal off of an object thereby providing the necessary information to calculate the distance of the object.

Figure 1:
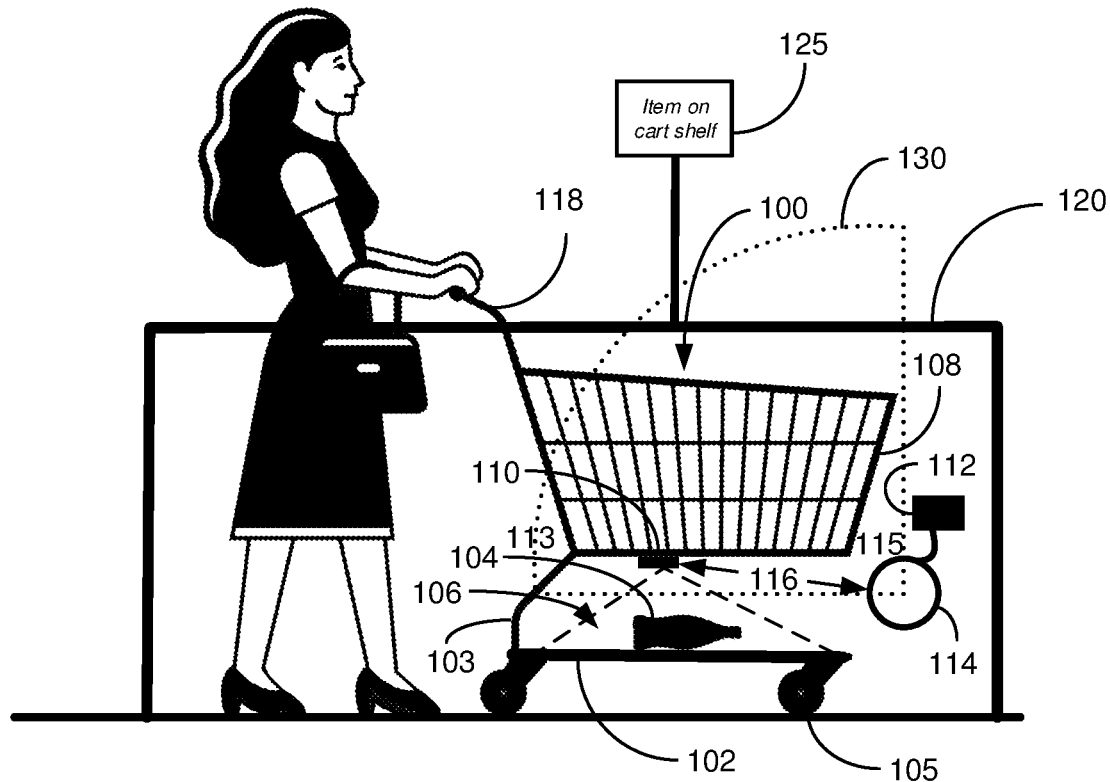
FIG. 1 depicts a block diagram of a checkout stand and shopping cart arrangement consistent with embodiments of the present invention.

FIG. 1 depicts a checkout stand and shopping cart arrangement consistent with embodiments of the present invention. More specifically, the shopping cart 100 generally comprises a basket 108, a shelf 102 connected to the basket 108 by way of a frame 103, a handle 118 used to push the shopping cart 100 and wheels 105 adapted to easily move and navigate the cart 100 across a smooth surface, e.g., the ground. The basket 108 is the primary receptacle for holding items, such as groceries. The shelf 102 is located under the basket 108 and is spaced sufficiently under the basket 108 to support at least one item, generally a larger item, such as a ream of paper towels or a case of soda, for example.

In the present embodiment, at least one distance measuring sensor module 110, which comprises a distance measuring sensor 208 (shown in FIG. 2), is connected to the shopping cart 100 under the basket 108. The distance measuring sensor 208 is positioned so that the shelf 102 is in the field of view 106 of the distance measuring sensor 208 that is comprised by the cart module 110. Other embodiments contemplate one or more distance measuring sensors located in other places along the shopping cart 100 which are positioned so that the shelf 102 or items 104 on the shelf 102 is/are in the field of view 106. In the case of multiple distance measuring sensors, they may collectively view the shelf 102 either from a single location (see FIGS. 6A and 6B) or from multiple locations. For example, one distance measuring sensor could be located at the front of the cart 115 and another distance measuring sensor could be located at the back of the cart 113 wherein the shelf 102 could be in the field of view for each of the sensors or optionally the shelf 102 is collectively in the field of view only when both sensors are being used. In the case where the shopping cart 100 comprises a frame assembled from hollow metal tubes or other structural beams made up of non-metal tubes such as polymer or polymer based composites. Some embodiments envision one or more distance measuring sensors 208 buried in the hollow metal tube/s or non-metal structural beams to protect the sensor from damage, for example due to weather, or when the shopping carts are nested together, or general rough handling by a person using the shopping cart 100.

Figure 2:
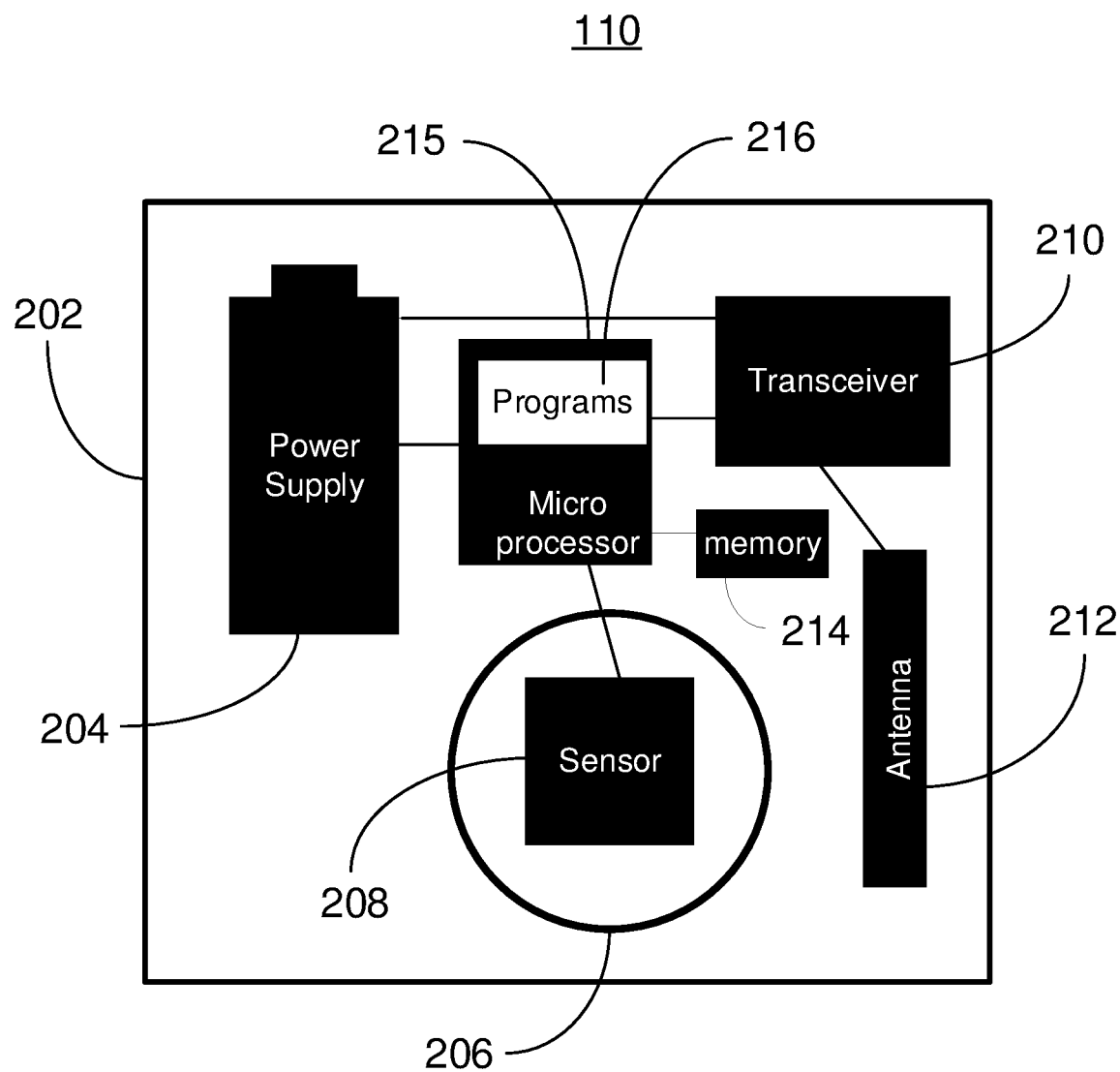
FIG. 2 depicts a block diagram of a distance measuring sensor module 110 consistent with embodiments of the present invention.

FIG. 2 is a block diagram of a distance measuring sensor module (cart module) 110 consistent with embodiments of the present invention. The cart module 110 generally comprises a distance measuring sensor 208 that is controlled by a microprocessor/controller 215 that possesses the necessary computational elements known to those skilled in the art to execute controlling functions, distance data processing algorithms, and programs 216. Electrically and communicatively connected to the microprocessor 215 in addition to the distance measuring sensor 208 are a) storage memory 214 and b) a transceiver 210 and an antenna 212. The antenna 212 is operably connected to a wireless communications circuit (not shown), which may be an integrated circuit known to those skilled in the art. If the cart transceiver 210 needs power, a power supply 204, e.g. a battery or current from the transceiver powered by induced electromagnetic waves provided in the interrogation zone 130, is connected and configured to power the cart transceiver 210, the microprocessor 215 and the distance measuring sensor 208, as shown. Certain embodiments envision power supplied by electromagnetic waves strong/powerful enough to induce an electrical current in the antenna 212 powerful enough to drive the cart module 110. Hence, the power supply can be electromagnetic waves that are strong enough to induce current in the cart module 110 via the antenna 212. Certain embodiments contemplate the electromagnetic waves being harvested by an antenna that is not part of the cart module 110 or the shopping cart transceiver, but is possessed elsewhere on the shopping cart 100. All of these components (204, 208, 210, 212, 214 and 215) can be contained in a housing/enclosure 202. The housing 202 provides a window 206 for the distance measuring sensor 208 to freely view the shelf 102. A skilled artisan will appreciate the other necessary electrical components, such as wires, resistors, diodes, RAM, EPROM, wireless communications circuit's and other specialty circuits, etc. that are necessary to the cart module 110 are not shown for the sake of simplicity. Other embodiments envision one or more of the aforementioned elements depicted in FIG. 2 not being enclosed by the housing 202. While other embodiments envision no housing whatsoever.

The distance measuring sensor module 110 is configured and arranged to wirelessly communicate with the interrogation zone module 112 that when located at a checkout stand 120 will be referred to as the checkout stand module. Certain embodiments envision different modes of wireless communication when coupled, such as through radio waves, UV light, etc., known to those skilled in the art within the scope and spirit of the present invention.

Figure 3:
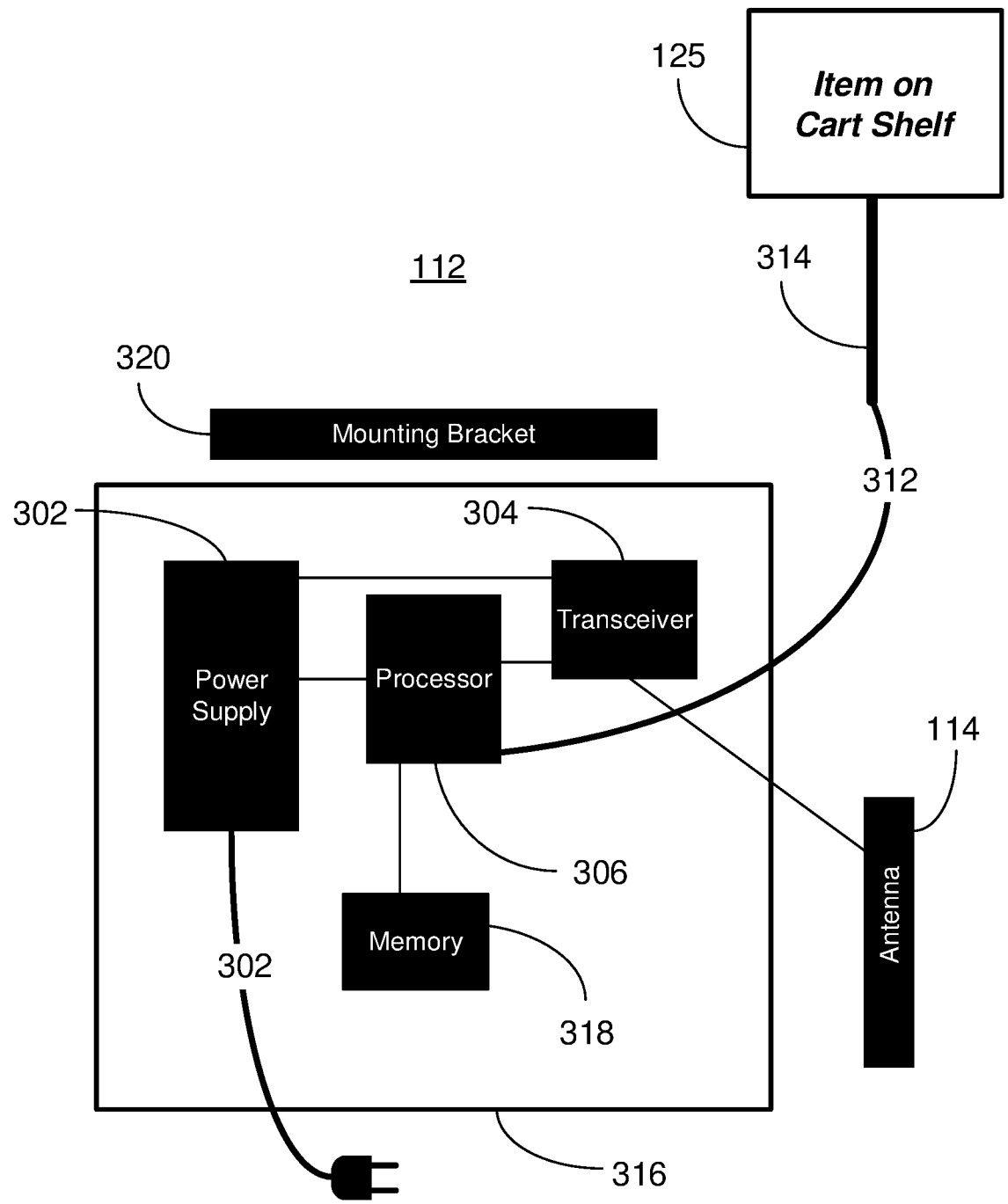
FIG. 3 depicts a block diagram of a checkout stand module embodiment consistent with embodiments of the present invention.

FIG. 3 depicts a block diagram of a checkout stand module embodiment consistent with embodiments of the present invention. As shown, a power supply 302 is directly connected to a checkout stand transceiver 304 and a microprocessor 306. Though embodiments herein refer to a checkout stand transceiver 304 for ease of discussion and consistency, transceiver 304 is not so limited to be at a checkout stand 120. Rather, transceiver 304 is envisioned to be in one or more locations that can be generically referred to as a "cart reader" (around a store or elsewhere). Because the checkout stand module 112 is statically located at the checkout stand 120 (fixedly and immobile mounted to the checkout stand 120), the power supply 302 can be arranged to receive power from an outlet (not shown) by way of a power cord 305. The microprocessor 306 is attached to non-transitory memory 318 adapted to store or otherwise maintain data that is used by the microprocessor 306. The microprocessor 306 is also directly linked to the checkout stand transceiver 304, which is adapted and configured to communicate with the cart transceiver 210 via the checkout stand antenna 114. The microprocessor 306 is further connected to a checkout stand display 125 via a wireline 312. The checkout stand display 125 is mounted to the checkout stand 120 by way of a display stand 314. Certain embodiments envision the checkout stand module 112 being essentially enclosed by a checkout stand module housing 316 and mounted to the checkout stand 120 via a mounting bracket 320. The aforementioned checkout stand module elements 112 do not require being in an enclosure in some embodiments. Certain embodiments envision this checkout stand module 112 being supplied constant electrical power because this checkout stand module 112 embodiment is simply plugged into an electrical outlet. Other embodiments envision the checkout stand module 112 being powered by battery power.

Figure 4:
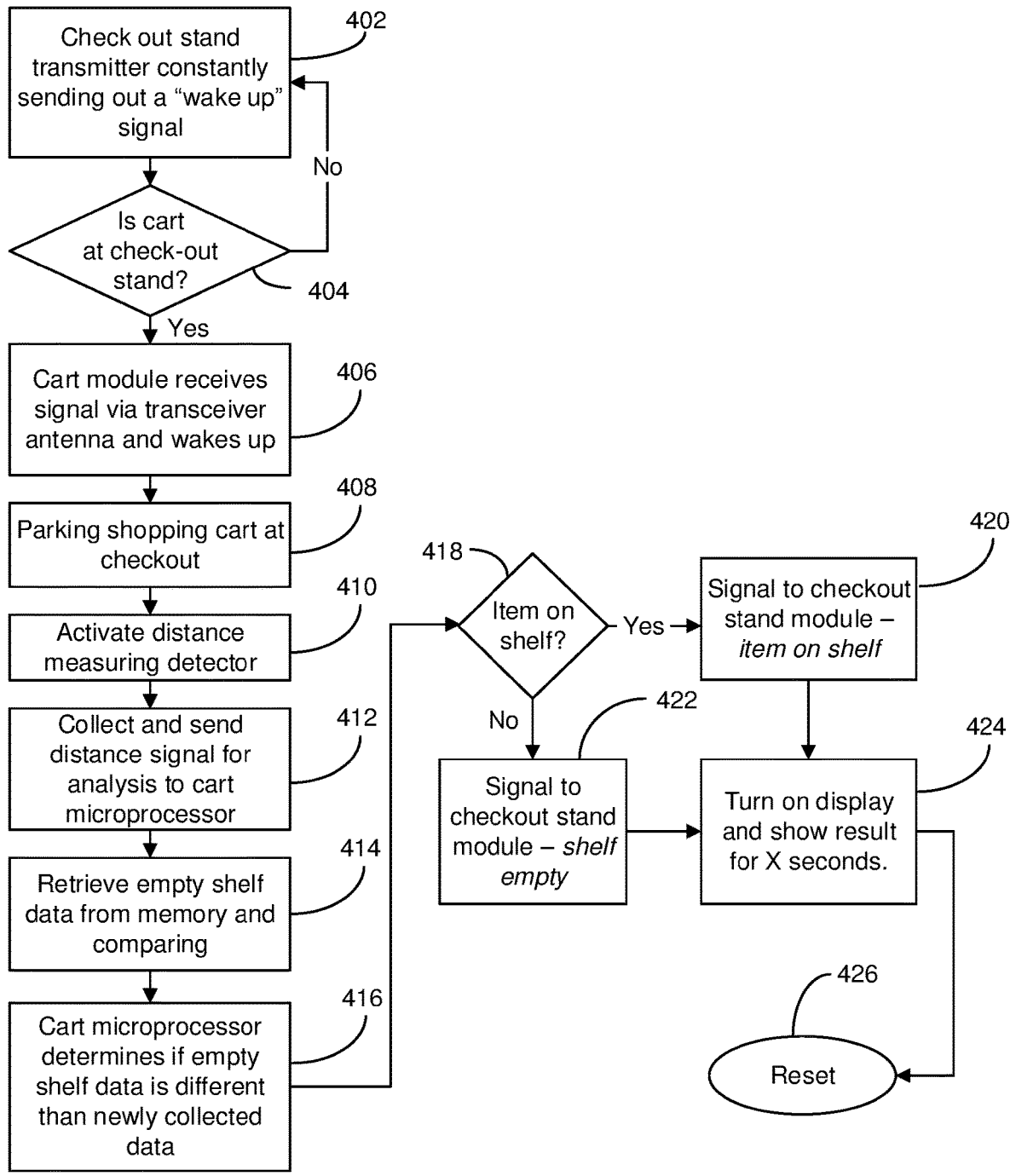
FIG. 4 is a block diagram illustrating method steps to the shopping cart and checkout stand operation consistent with embodiments of the present invention.

FIG. 4 is a block diagram illustrating method steps directed to shopping cart and checkout stand operations consistent with embodiments of the present invention. FIG. 4 is in view of FIGS. 1-3. The checkout stand power supply 302 powers the checkout stand module 112 to constantly transmit a "wake-up" signal through the checkout stand transceiver antenna 114, step 402. Some embodiments contemplate that the checkout stand module 112 going into detection mode, which is to transmit a "wake-up" signal for a second or less in intervals, such as every five or ten seconds for example to conserve power. Because the signal being transmitted by the checkout stand antenna 114 naturally attenuates as a function of distance from the antenna 114, certain embodiments contemplate adjusting the power of the signal to be powerful enough to "wake-up" the cart module 110 at a predefined distance (radius of the zone 130), step 404. Some embodiments contemplate the predefined distance to be a five foot radius, while others may be less than five feet, and yet others contemplate less than ten feet when the signal is strong enough to activate the cart module 110. This predefined distance radiates in directions determined by the type of antenna 114 and creates a zone referred to herein as an interrogation zone 130. An interrogation zone 130 is a zone in which communication/interrogation of the cart module 110 can occur, such as by a generic "cart reader" located by the checkout stand module 112, for example. Certain implementations of radiation pattern can be "directional" (as opposed to an omnidirectional pattern that radiates in all directions), which can be controlled by using an antenna that only primarily radiates "forward", for example. Hence, the zone can be focused only on the cart 100 and not towards another lane or elsewhere. This implementation is especially well suited for methods using an RFID cart reader. The predefined distance can be controlled to extend just enough to read the particular cart 100 at the checkout stand 120 to eliminate the possibility of reading other carts that may be in other checkout stands nearby. Assuming after an episode of shopping, the shopping cart 100 is wheeled, or otherwise pushed, into the interrogation zone 130, the cart module 110 "picks-up" (receives) the "wake-up" signal from the interrogation zone transceiver 304 thereby waking up the cart microprocessor 215, step 406. In this embodiment, the cart microprocessor 215 is in a "sleep" (or quiescent) mode when outside of an interrogation zone thereby preserving battery life by drawing low power from the battery 204. A skilled artisan will appreciate that the "sleep" mode can be configured to draw only power sufficient enough to "wake-up". In other words, waking-up is to become sufficiently active to control the normal activities of the cart module 110, such as data collection and communication transmission as described in conjunction with FIG. 4. Certain embodiments envision a woken up cart module 110 being essentially fully activated whereby the cart module 110 is functional to do all required tasks dictated by the programming routines (algorithms) maintained in or accessible to the cart module 110. It is further contemplated in some embodiments that the microprocessor 215 controls all functionality in the cart module 110, which in this case is accomplished by executing all relevant internal microprocessor functionality. Certain other embodiments contemplate the checkout stand 120 being configured to determine the presence of the shopping cart 100 in the interrogation zone 130 based on signal strength of the shopping cart transceiver 210. This can be accomplished by either providing some amount of constant power to the cart transceiver 210 or by powering-up the cart module 110 when entering the interrogation zone 130 thereby being sensed by the interrogation module 112. In the case where the shopping cart module 110 uses power from electromagnetic waves to induce electricity via inductive coupling using the antenna 212, such as when the shopping cart module is devoid of an on-board power supply, such as a battery, the microprocessor 215 is deprived of power and is essentially off unless the cart module 100 is inductively powered.

With continued reference to FIG. 4, step 408 contemplates an embodiment whereby the cart module 110 holds off further communication with the checkout stand module 112 until the shopping cart 100 essentially is parked at the checkout stand 120. Essentially parked is envisioned to mean stopped or nearly stopped, such as when items are being removed from the shopping cart 100 or are about to be removed from the shopping cart 100. Essentially parked can be evaluated by breaking a laser beam, photodiode, or some other location identifying device. Other embodiments envision a timer managed by either the cart microprocessor 215 or the checkout stand microprocessor 306 which delays any further actions by the cart microprocessor 215 until a predetermined amount of time has passed since the shopping cart 100 passes into the interrogation zone 130. The predetermined amount of time assumes that the shopping cart 100 is essentially parked and can be controlled by the cart microprocessor 215 and more specifically the programs/routines 216 running/executing therein, step 408.

Once the shopping cart 100 is essentially parked at the checkout stand 120, the cart microprocessor 215 controls the distance measuring sensor/detector 208 to take an array of distance measurements in the field of view 106 of the shelf 102, step 408. The array of distance measurements (detector signal) is either retained in temporary memory (not shown) or in the non-transient memory 214, but is otherwise analyzed to determine distance related data (in the field of view 106 of the shelf 102) by the cart microprocessor 215 (or more specifically the programs/routines 216 running in the microprocessor 215), step 412. For purposes of simplicity, the analyzed distance measurements of the field of view 106 of the shelf 102 at the checkout stand 120 will be referred to as the "second post processed shelf data". Analyzed distance measurements of the field of view 106 of the shelf 102 when empty, such as prior to shopping, retained in the non-transitory memory 214 will be referred to as the "first post processed shelf data". The first post processed shelf data, of the known empty shelf 102, is retrieved from the non-transitory memory 214 by the cart microprocessor 215 and compared with the second post processed shelf data by the cart microprocessor 215, step 414. One example of determining a baseline of an empty shelf 102 is to collect a first set of distance measurements based on predefined features of the shelf 102, such as a wire platform or some other basic features that may comprise the shelf 102. Certain embodiments contemplate the first post processed shelf data being obtained by the distance measuring sensor/detector 208 automatically when the shopping cart 100 is known to be empty. Some embodiments contemplate taking the first post processed shelf data when the shopping cart 100 is moved into an initialization interrogation zone (not shown), such as when nestled with other shopping carts in a different part of a store or when passing through an entrance, just to name several examples. Once obtained, the first post processed shelf data is then stored to the non-transitory memory 214. The first post processed shelf data can be taken once and used thereon out, or optionally can be taken every time a shopping cart 100 is known to be empty and a) maintained as a most recent set of data alongside older sets of data or b) replace previous renditions of first post processed shelf data. Some embodiments contemplate a recalibration schemes executed by a wireless command or a switch system comprised by the shopping cart 100 to set what defines an empty cart shelf 102.

Based on comparing the second post processed shelf data with the first post processed shelf data, the cart microprocessor 215 will determine if there is any change between the two sets of data, step 416. Block 418 is a decision step for whether or not the data is different, i.e., if there is at least one item 104 disposed on the shelf 102. If yes, signal to the checkout stand transceiver 304 via the cart transceiver 210 that there is at least one item 104 disposed on the shelf 102, step 420. Otherwise, if no, signal the checkout stand transceiver 104 that the shelf 102 is empty, step 422. During this process, certain embodiments contemplate that the checkout stand transceiver 304 is constantly listening 116 for data from the cart transceiver 210. Once received, the checkout stand transceiver 304 transfers the results to the checkout stand processor 306, which in turn transmits a message to the display 125 whether or not an item is on the shelf 102, step 424. Some embodiments contemplate an alert system other than a display that displays a message, such as lights, sounds or a combination of other alert mechanisms known to those skilled in the art. Some embodiments contemplate the display monitor 125 will display the result for a predetermined amount of time, while other embodiments contemplate the display will reset upon completion of the transaction by the cashier, just to name several examples. Certain embodiments contemplate the result being stored in the checkout stand module memory 318. Other embodiments contemplate a serial number associated with the shopping cart 100 will also be transmitted along with the result and retained in memory 318. Some embodiments contemplate at least the second post processed shelf data being reset upon completion of the transaction by the cashier or when leaving the interrogation zone, for example, step 426. Other embodiments contemplate retaining a message in the nonvolatile cart memory 214 that the second post processed shelf data has already been used and is no longer valid. Yet other embodiments contemplate tagging the second post processed shelf data with an indexed number reflecting the number of times the shopping cart 100 has been interrogated at the checkout counter 120.

Figure 5:
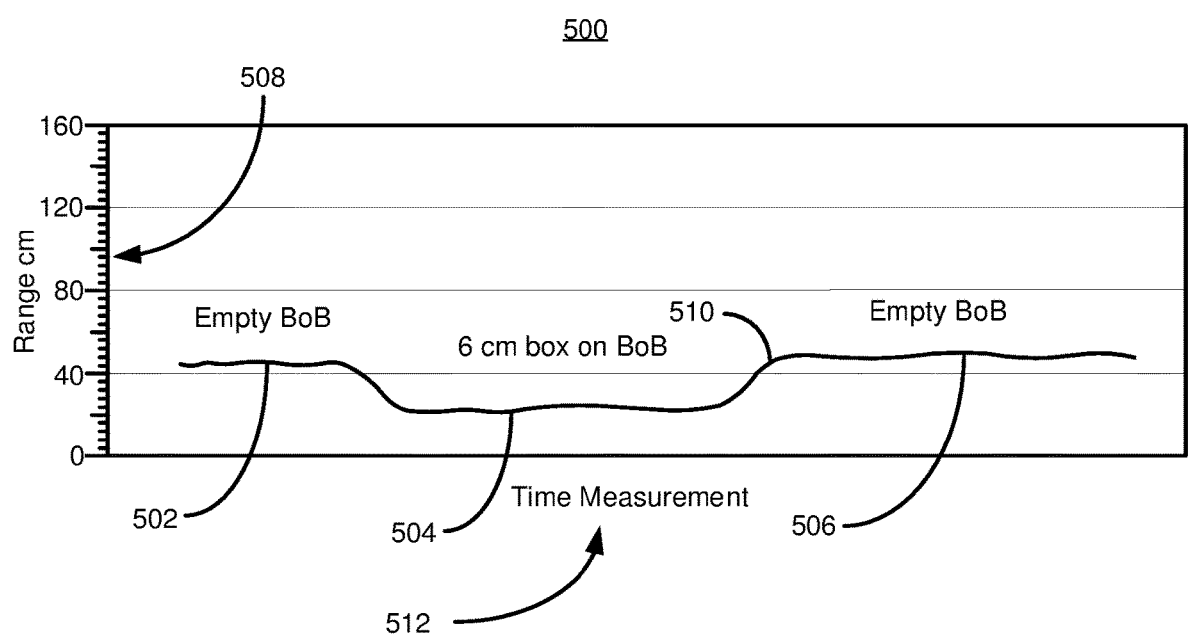
FIG. 5 depicts a plot of the distance change with a time-of-flight sensor when an object is placed on the cart bottom shelf consistent with embodiments of the present invention.

FIG. 5 depicts a plot of the distance change with a time-of-flight sensor when an object is placed on the cart bottom shelf 102 consistent with embodiments of the present invention. The graph plot 500, is the output from a time-of-flight distance sensor that is pointed down at the bottom shelf 102 of a shopping cart 100. The graph 500 is a distance range in centimeters (x-axis) 508 versus time (y-axis) 512 of a 6-cm-high box placed on the shelf 102. More specifically, plot 510 has 1) a first empty region of the plot 502 wear in the shelf 102 is empty, 2) a second occupied region of the plot 504 having a 2-inch-high box placed on the shelf 102, and 3) a third region of the plot 506 wherein the shelf 102 is empty. The graph 500 provides an example of how a distance sensor can measure if the bottom shelf 102 of the shopping cart 100 is empty.

FIGS. 6A and 6B show the coverage of four commercially available time-of-flight distance sensors projected on the bottom shelf 102 of a shopping cart 100 consistent with embodiments of the present invention. As shown in FIG. 6A, the shelf 102 has four regions (A, B, C and D) that comprise the field of view collectively from four time-of-flight distance sensors 208 as viewed looking down at the top of the shelf 102. Regions A and B are elliptical with the long axis being 15.76 inches. Regions C and D are essentially circular with the diameter being 7.63 inches. The dimensions of the shelf 102 are provided as shown in inches. FIG. 6B depicts a side view of a shopping cart 100 with the front of the shopping cart 115 and the wheels 105 shown for reference. Mounted on the bottom of the basket 108 are the four time-of-flight sensors 208. The field of view 106A&B and 106C&D illustratively depict the circles and ellipses from FIG. 6A. The dimensions of the field of view of the bottom shelf 102 are shown for reference. Certain embodiments contemplate the first set of distance measurements and the second set of distance measurements are consistently based on a specified number of data points angled in a consistent direction, that is collecting and comparing data points that originate from the distance detector/transmitter along the same path so as to compare the same points in a matrix (apples with apples). Other embodiments envision the first set of distance measurements and the second set of distance measurements being based on predefined features of the shelf.

Figure 6C:
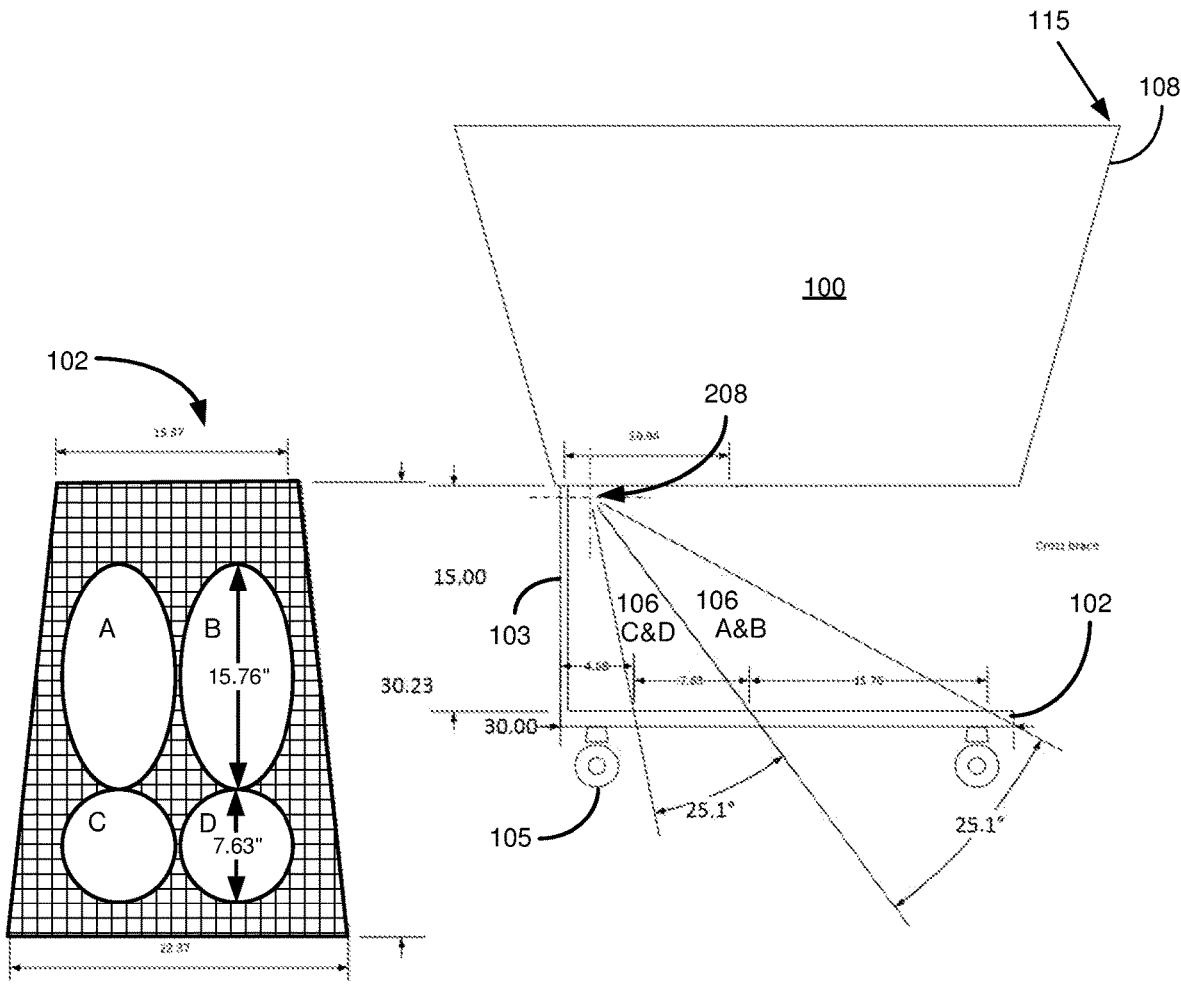
FIG. 6C depicts a diagram of a matrix of distance measurement points in a field of view consistent with embodiments of the present invention.

FIG. 6C illustratively depicts a block diagram of elliptical field of view region 106A. The elliptical field of view region 106A depicts a matrix, or array, 660 of data points 662 each providing a distance measurement. As can readily be understood, if an object is placed on the bottom shelf 102, the data points 662 that make up the array 660 will change. In some embodiments, the data points 662 can collectively show the topographical layout of the item/s on the bottom shelf 102.

Figure 6C:
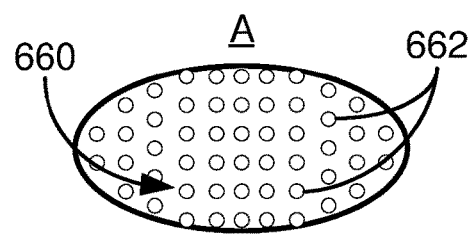

Certain embodiments disclosed contemplate a class of time-of-flight sensors that generally work by measuring the time it takes for an energy wave (such as infrared energy waves) sending/emitting a pulse of infrared energy waves and measuring the time-of-flight for the energy wave to bounce off an object in front of it and then return. From this time-of-flight (TOF), the distance to the bottom shelf 102 or an item 104 thereon is determined. In certain embodiments one or more TOF sensor(s) 208 is mounted on the shopping cart 100 pointing down on the shelf 102, as shown in FIGS. 1 and 6, and "calibrated" so that the cart microprocessor 105 and associated electronics are programmed to evaluate the distance from the TOF sensor 208 to the shelf 102 when no objects 104 are on the shelf 102 (such as when nestled with other carts for storage). For example, if the distance between the bottom shelf 102 and the bottom of the shopping cart basket 108 where the TOF sensor 215 is located is 16 inches, then this distance will be stored in the cart microprocessor memory 214. If a 4-inch high item is placed on the bottom shelf 102 of the shopping cart 100, when the time of flight sensor 208 is activated, it will measure the distance to the bottom shelf 102 as 12 inches (16 inches minus 4 inches). The change in distance clearly indicates that the bottom shelf 102 is not empty. TOF and ultrasonic sensors as disclosed herein are sufficiently sensitive and reliable to determine if an item is disposed on the bottom shelf 102. Depending on the size of the shopping cart 100, it may require a plurality of distance measuring sensors to provide full coverage of the bottom shelf 102. Certain embodiments envision distance sensors 208 providing an added advantage of having a small form factor and simple I2C data bus that allows up to 16 uniquely addressed sensors to be attached to a single 2-wire bus. In some embodiments, both TOF sensors and Ultrasonic (US) sensors can be made to efficiently only detect the presence of an object on the bottom shelf and yet they do not try and in some cases are unable to identify the object (i.e., what the object is). Moreover, TOF and US sensors also produce a relatively small amount of data compared with an optical camera (a distance measurement) that takes very minimal data processing (and cart electronics module battery power) to analyze the data.

Distance measuring sensors provide benefits over visual light reliant cameras and visual light optical detectors because visual light detectors and cameras are dependent on lighting conditions (that can change) and are further negatively affected by changes in the "optical environment" such as checkered floors or chipped-away paint on the shopping carts. Infrared TOF sensors and US sensors, in this application, send the same indication of an item on the bottom of the shelf 102 regardless of the lighting (lights are on or off). Furthermore, these distance sensors are insensitive to color or chromatic variations of the floor (especially a black and white checkered floor) or shelf 102. In addition, distance measuring sensors are excellent at avoiding falsely reporting a non-empty shelf 102 when a customer's feet are under the cart shelf 102. "Feet under the shelf" is a major cause of false positive readings with visible light detection systems. Distance measuring sensors as disclosed herein will never report feet under the cart 100 as a non-empty shelf 102. This is because the distance to the feet is greater than the distance to the shelf 102. Moreover, the algorithm/s used in the cart microprocessor 215 only looks for objects that cause the distance to be shorter than the known distance to the shelf 102. In addition, distance sensors, such as TOF sensors, are uniquely effective on a shopping cart 100 because distance sensors are somewhat insensitive to a dirty protective cover, which is likely to happen given the environment in which a shopping cart 100 is subjected. With visible light/optical systems, a dirty lens cover can impact the quality of the image and reduce the reliability of detecting items 104 on the bottom shelf 102. In other words, for a TOF sensor, weak signals due to some dirt on the sensor cover can be ignored by the algorithm/s driving the data collection making the distance measuring sensors more reliable than visible light and optical methods in dirt prone environments.

With the present description in mind, below is a summary of some embodiments consistent with the present invention. The elements called out below are examples provided to assist in the understanding of the present invention and should not be considered limiting.

Certain embodiments envision a shopping cart generally comprising: a basket; a shelf connected to the basket, the shelf located under the basket and spaced sufficiently under the basket to support at least one item; at least one distance measurement sensor connected to the shopping cart, the shelf in a field of view of the distance measurement sensor; a power supply connected to and adapted to power the distance measurement sensor; a shopping cart transceiver connected to and adapted to be powered by the power supply, the shopping cart transceiver comprises an antenna; and a microprocessor, powered by the power supply and connected to the shopping cart transceiver, configured to become fully activated when in an interrogation zone of an interrogation zone transceiver, the microprocessor configured to determine the presence of the item by comparing a second set of distance measurements of the shelf with the item against a first set of distance measurements of the shelf without the item, the first set of distance measurements and the second set of distance measurements obtained by the distance measurement sensor, the first set of distance measurements retained in non-transitory memory accessible to the microprocessor, the shopping cart transceiver configured to transmit the presence of the item supported by the shelf to the interrogation zone transceiver.

The shopping cart embodiment further contemplating wherein the interrogation zone transceiver is connected to a monitor at a checkout stand that is configured to display the presence of the item disposed on the shelf.

The shopping cart embodiment further considering wherein the interrogation zone is within 5 feet of a checkout stand.

The shopping cart embodiment further imagining wherein the shopping cart transceiver and the interrogation zone transceiver are configured to communicate wirelessly.

The shopping cart embodiment further envisioning wherein the microprocessor, powered by the power supply, is configured to determine when the shelf is empty, or not empty, by comparing a third set of distance measurements of the shelf that no longer has the item against the first set of distance measurements. This embodiment further envisioning the shopping cart transceiver being configured to transmit that the shelf is empty to the interrogation zone transceiver, the interrogation zone transceiver connected to a means for communicating that the shelf is empty, such as an indication light, a speaker that communicates a status, a display screen, etc.

The shopping cart embodiment further contemplating wherein the interrogation zone transceiver is located at a checkout stand. This embodiment further contemplating the interrogation zone being defined by the presence of a magnetic field or a radio field strong enough to induce a voltage in the antenna included in the shopping cart transceiver, the voltage configured to wake-up the microprocessor from a low-power quiescent state to being fully activated.

The shopping cart embodiment further considering wherein the distance measurement sensor and the shopping cart transceiver are adapted to become powered by the microprocessor when it becomes fully activated.

The shopping cart embodiment further imagining wherein the interrogation zone transceiver is adapted to transmit the presence of the item supported by the shelf to a network of other devices.

The shopping cart embodiment further envisioning wherein the shopping cart transceiver is configured to further transmit an ID number along with either an indication that the item is on the shelf or that the shelf is empty.

The shopping cart embodiment further contemplating wherein the shopping cart is adapted to receive data from the interrogation zone transceiver and adapted to store the data to the non-transient memory. This embodiment further contemplating the data including a series of previous passes through a checkout stand over a set period of time.

The shopping cart embodiment further imagining wherein the first set of distance measurements and the second set of distance measurements are based on a specified number of data points angled in a consistent direction.

The shopping cart embodiment further contemplating wherein the first set of distance measurements and the second set of distance measurements are based on predefined features of the shelf.

The shopping cart embodiment further considering wherein the first set of distance measurements in the nonvolatile memory is adapted to be recalibrated via a recalibration routine executed by the microprocessor. This embodiment further considering the recalibration scheme being initiated at a storage location of the shopping cart when the shelf is empty. Optionally, this embodiment further considering the recalibration routine being adapted to be executed by a wireless command or a switch system comprised by the shopping cart.

The shopping cart embodiment further pondering wherein the checkout stand is configured to determine the presence of the shopping cart in the interrogation zone based on signal strength of the shopping cart transceiver.

The shopping cart embodiment further contemplating wherein the distance measurement sensor is integrated in metal tubing comprised by the shopping cart.

The shopping cart embodiment further envisioning wherein the distance measurement sensor is integrated in the structure of the shopping cart.

The shopping cart embodiment further imagining wherein the power supply is electromagnetic waves strong enough to induce current via the antenna and through the transceiver.

Another embodiment of the present invention envisions a method comprising: providing a shopping cart that possesses a basket, a shelf connected to and located under the basket, a microprocessor, a distance measurement sensor, non-transitory memory, and a shopping cart transceiver; collecting a first set of distance measurements of the shelf when empty via the distance measurement sensor; storing the first set of distance measurements to the non-transitory memory; collecting a second set of distance measurements of the shelf via the distance measurement sensor when within an interrogation zone; comparing the second set of distance measurements with the first set of distance measurements retained in the non-transitory memory; determining a status of whether there is at least one item disposed on the shelf from the comparing step, the status is either an empty status indicating no item disposed on the shelf or a full status indicating at least one item disposed on the shelf; and transmitting the status to an alert system.

The method embodiment further pondering wherein the microprocessor controls the distance measurement sensor, the non-transitory memory, a power supply, and the shopping cart transceiver.

The method embodiment further contemplating wherein the collecting the first set of distance measurements is accomplished when the microprocessor is in an active state defined by controlling functionality and power to the distance measurement sensor, the non-transitory memory, and the shopping cart transceiver as well as executing all relevant internal microprocessor functionality. This embodiment can further comprise transitioning the microprocessor in a sleep state defined by low-power consuming condition, which is further contemplated wherein the transitioning step occurs after the storing step.

The method embodiment further considering wherein the collecting the first set of distance measurements is completed at a shopping cart holding area. This embodiment can additionally comprise clearing the non-transitory memory of at least the second set of distance measurements when in the shopping cart holding area.

The method embodiment further comprising energizing the antenna of the shopping cart transceiver when the shopping cart is moved within the predetermined distance of the checkout station. This method can further include waking up the microprocessor from the sleep state to the active state when sensing the energizing of the antenna wherein collecting the second set of distance measurements can occur after the waking up step.

The method embodiment further comprising providing notice at the checkout station of the status. This can further include wherein the notice is visually displayed via a display device, which for example can be wherein the display device is selected from a group comprising a light and a monitor.

The method embodiment further contemplating wherein the interrogation zone is a checkout station.

The method embodiment further pondering wherein the collecting a second set of distance measurements step, the comparing step, and the determining step are accomplished by power supplied to the microprocessor, the distance measurement sensor, the non-transitory memory, and a shopping cart transceiver. This is further envisioned wherein the power supplied is a battery system on the shopping cart, or wherein the power supplied is from electromagnetic waves powerful enough to induce an electrical current in an antenna possessed by the shopping cart, or optionally wherein the power supplied is from electromagnetic waves powerful enough to induce an electrical current in an antenna possessed by the shopping cart transceiver.

Yet another method embodiment contemplates: providing a shopping cart that includes a basket, a shelf connected to and located under the basket, a microprocessor, a distance measurement sensor, non-transitory memory, a power supply, and a shopping cart transceiver, the microprocessor controlling the distance measurement sensor, the non-transitory memory, the power supply, and the shopping cart transceiver; with the microprocessor in an active state, collecting a first set of distance measurements of the shelf when empty via the distance measurement sensor, the active state defined by controlling functionality and power to the distance measurement sensor, the non-transitory memory, and the shopping cart transceiver as well as executing all relevant internal microprocessor functionality; storing the first set of distance measurements to the non-transitory memory; transitioning the microprocessor in a sleep state defined by a low-power consuming condition after the storing step; the shopping cart transceiver receiving a wireless signal when in an interrogation zone produced by a checkout station transceiver; waking up the microprocessor from the sleep state to the active state; collecting a second set of distance measurements of the shelf via the distance measurement sensor when within the interrogation zone after the waking up step; comparing the second set of distance measurements with the first set of distance measurements retained in the non-transitory memory via the microprocessor; determining a status of whether there is at least one item disposed on the shelf from the comparing step, the status is either an empty status indicating no item disposed on the shelf or a full status indicating at least one item disposed on the shelf; transmitting the status to a checkout station; and providing notice at the checkout station of the status.

The above embodiments are not intended to be limiting to the scope of the invention whatsoever because many more embodiments are easily conceived within the teachings and scope of the instant specification. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though aspects of the present invention depict TOF and ultrasonic sensors, other distance sensors could equally be used while still maintaining substantially the same functionality without departing from the scope and spirit of the present invention. Another example is using a single module for the shopping cart and a single module for the checkout stand, however multiple modules can be used equally while still maintaining substantially the same functionality without departing from the scope and spirit of the present invention. Yet another example is the alert system is a display and display message, however an alert system can include lights, sounds or a combination of other alert mechanisms known to those skilled in the art without departing from the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A shopping cart comprising:
   a basket;
   a shelf connected to the basket, the shelf located under the basket and spaced sufficiently under the basket to support at least one item;
   at least one distance measurement sensor connected to the shopping cart, the shelf in a field of view of the at least one distance measurement sensor;
   a power supply connected to and adapted to power the at least one distance measurement sensor;
   a shopping cart transceiver connected to and adapted to be powered by the power supply, the shopping cart transceiver comprises an antenna; and
   a microprocessor, powered by the power supply and connected to the shopping cart transceiver, configured to become fully activated when in an interrogation zone of an interrogation zone transceiver, the microprocessor configured to determine a presence of the item by comparing a second set of distance measurements of the shelf with the item against a first set of distance measurements of the shelf without the item, the first set of distance measurements and the second set of distance measurements obtained by the at least one distance measurement sensor, the first set of distance measurements retained in non-transitory memory accessible to the microprocessor, the shopping cart transceiver configured to transmit the presence of the item supported by the shelf to the interrogation zone transceiver.

2. The shopping cart of claim 1 wherein the interrogation zone transceiver is connected to a monitor at a checkout stand that is configured to display the presence of the item disposed on the shelf.

3. The shopping cart of claim 1 wherein the interrogation zone is within 5 feet of a checkout stand.

4. The shopping cart of claim 1 wherein the shopping cart transceiver and the interrogation zone transceiver are configured to communicate wirelessly, the interrogation zone transceiver is in a location that is independent from the shopping cart.

5. The shopping cart of claim 1 wherein the interrogation zone transceiver is located at a checkout stand.

6. The shopping cart of claim 5 wherein the interrogation zone defined by a presence of a magnetic field or a radio field strong enough to induce a voltage in the antenna comprised by the shopping cart transceiver, the voltage adapted to wake-up the microprocessor from a low-power quiescent state to being fully activated.

7. The shopping cart of claim 1 wherein the shopping cart transceiver is configured to further transmit an ID number along with either an indication that the item is on the shelf or that the shelf is empty.

8. The shopping cart of claim 1 wherein the first set of distance measurements and the second set of distance measurements are based on predefined features of the shelf.

9. The shopping cart of claim 1 wherein a checkout stand is configured to determine a presence of the shopping cart in the interrogation zone based on signal strength of the shopping cart transceiver.

10. A method comprising:
providing a shopping cart that possesses a basket, a shelf connected to and located under the basket, a microprocessor, a distance measurement sensor, non-transitory memory, and a shopping cart transceiver;
collecting a first set of distance measurements of the shelf when empty via the distance measurement sensor;
storing the first set of distance measurements to the non-transitory memory;
collecting a second set of distance measurements of the shelf via the distance measurement sensor when within an interrogation zone;
comparing the second set of distance measurements with the first set of distance measurements retained in the non-transitory memory;
determining a status of whether there is at least one item disposed on the shelf from the comparing step, the status is either an empty status indicating no item disposed on the shelf or a full status indicating at least one item disposed on the shelf; and
transmitting the status to an alert system.

11. The method of claim 10 wherein the collecting the first set of distance measurements is accomplished when the microprocessor is in an active state defined by controlling functionality and power to the distance measurement sensor, the non-transitory memory, and the shopping cart transceiver as well as executing all relevant internal microprocessor functionality.

12. The method of claim 11 further comprising transitioning the microprocessor in a sleep state defined by low-power consuming condition.

13. The method of claim 10 wherein the collecting the first set of distance measurements is completed at a shopping cart holding area.

14. The method of claim 10 further comprising energizing the antenna of the shopping cart transceiver when the shopping cart is moved within a predetermined distance of a checkout station, the predetermined distance is defined by the interrogation zone.

15. The method of claim 14 further comprising waking up the microprocessor from the sleep state to the active state when sensing the energizing of the antenna.

16. The method of claim 15 wherein the collecting the second set of distance measurements occurs after the waking up step.

17. The method of claim 10 wherein the interrogation zone is a checkout station.

18. The method of claim 10 wherein the collecting a second set of distance measurements step, the comparing step, and the determining step are accomplished by power supplied to the microprocessor, the distance measurement sensor, the non-transitory memory, and the shopping cart transceiver.

19. The method of claim 10 wherein the microprocessor controls the distance measurement sensor, the non-transitory memory, a power supply, and the shopping cart transceiver.

20. A method comprising:
providing a shopping cart that includes a basket, a shelf connected to and located under the basket, a microprocessor, a distance measurement sensor, non-transitory memory, a power supply, and a shopping cart transceiver, the microprocessor controlling the distance measurement sensor, the non-transitory memory, and the shopping cart transceiver powered by the power supply;
with the microprocessor in an active state, collecting a first set of distance measurements of the shelf when empty via the distance measurement sensor, the active state defined by controlling functionality and power to the distance measurement sensor, the non-transitory memory, and the shopping cart transceiver as well as executing all relevant internal microprocessor functionality;
storing the first set of distance measurements to the non-transitory memory;
transitioning the microprocessor in a sleep state defined by a low-power consuming condition after the storing step;
the shopping cart transceiver receiving a wireless signal when in an interrogation zone produced by a checkout station transceiver while the microprocessor is in the sleep state;
waking up the microprocessor from the sleep state to the active state via the wireless signal;
collecting a second set of distance measurements of the shelf via the distance measurement sensor when within the interrogation zone after the waking up step;
comparing the second set of distance measurements with the first set of distance measurements retained in the non-transitory memory via the microprocessor;
determining a status of whether there is at least one item disposed on the shelf from the comparing step, the status is either an empty status indicating no item disposed on the shelf or a full status indicating at least one item disposed on the shelf;
transmitting the status to a checkout station; and
providing notice at the checkout station of the status.

* * * * *